(12) United States Patent
Mueller et al.

(10) Patent No.: US 8,882,041 B2
(45) Date of Patent: Nov. 11, 2014

(54) INSULATION PACKAGE FOR INSULATING A CABIN OF A VEHICLE

(75) Inventors: Rainer Mueller, Rosengarten (DE); Stefan Nill, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 349 days.

(21) Appl. No.: 12/816,524

(22) Filed: Jun. 16, 2010

(65) Prior Publication Data

US 2010/0320323 A1    Dec. 23, 2010

Related U.S. Application Data

(60) Provisional application No. 61/219,482, filed on Jun. 23, 2009.

(30) Foreign Application Priority Data

Jun. 23, 2009    (DE) .......................... 10 2009 030 037

(51) Int. Cl.
B64C 1/40    (2006.01)

(52) U.S. Cl.
USPC ...................... 244/121; 244/129.2; 296/181.6

(58) Field of Classification Search
CPC .......... B64C 1/40; B64C 1/403; B60R 13/08; A62C 3/08
USPC ............ 244/129.2, 121, 131, 129.1; 277/608, 277/609, 616, 630, 637; 403/408.1, 288; 296/39.3, 181.6
See application file for complete search history.

(56) References Cited

U.S. PATENT DOCUMENTS

| 3,182,119 | A | * | 5/1965 | Millard | 174/151 |
| 5,866,231 | A | * | 2/1999 | Bodin et al. | 428/131 |
| 6,358,591 | B1 | * | 3/2002 | Smith | 428/74 |
| 2007/0018042 | A1 | | 1/2007 | Muller et al. | |
| 2008/0308676 | A1 | | 12/2008 | Muller | |
| 2009/0090812 | A1 | | 4/2009 | Boock et al. | |

FOREIGN PATENT DOCUMENTS

DE        10 2004 001 083 A1    8/2005

OTHER PUBLICATIONS

German Patent Office, German Office Action dated Sep. 13, 2012 for German Patent Application No. 10 2009 030 037.6.

* cited by examiner

*Primary Examiner* — Brian M O'Hara
(74) *Attorney, Agent, or Firm* — Ingrassia Fisher & Lorenz, P.C.

(57) ABSTRACT

An insulation package is provided for insulating a cabin of a vehicle that includes, but is not limited to at least one wrapping foil and at least one core layer of an insulation material. The wrapping foil envelopes the core layer at least in some regions and includes, but is not limited to at least one opening for feeding-through a holding element. On the wrapping foil a fastening element is arranged that is designed to establish a mechanical connection with the holding element fed through the opening. This can be a positive-locking or a non-positive-locking connection. By integrating the fastening element in the insulation package, the expenditure for separate fasteners can be saved so that the installation time and the different components can be reduced.

16 Claims, 5 Drawing Sheets

INSULATION PACKAGE FOR INSULATING A CABIN OF A VEHICLE

CROSS-REFERENCE TO RELATED APPLICATIONS

This application claims the benefit of the filing date of German Patent Application No. 10 2009 030 037.6 filed Jun. 23, 2009 and of U.S. Provisional Patent Application No. 61/219,482 filed Jun. 23, 2009, the disclosures of which applications is hereby incorporated herein by reference.

TECHNICAL FIELD

The invention relates to an insulation package for insulating a cabin of a vehicle; to a method for producing an insulation package; to the use of an insulation package; as well as to an aircraft comprising at least one insulated cabin.

BACKGROUND

In order to meet thermal and acoustic requirements in a cabin of a vehicle, insulation structures are used which are normally arranged between an interior lining of a cabin and an exterior skin of a vehicle. A host of various insulation materials are available for this purpose, with glass wool and foam material being in widespread use. The acoustically and thermally active insulation material is provided with a wrapping that protects the insulation material from mechanical damage, and at the same time prevents any ingress of fluids. If the insulation is used in a vehicle body or fuselage that comprises an elongated tubular shape, different insulation mats are usually used for the wrapping of stiffening members, for example frame elements, and for the lining of so-called skin field regions situated between the stiffening members. These different insulating mats are referred to as frame element insulation and field insulation, which essentially differ only in their exterior dimensions.

According to the present state of the art, fastening of frame element insulation and field insulation of the vehicle body structure takes place by means of pins and discs. For example, for this purpose frame elements can comprise a number of holes in which pins are positioned and affixed. The insulation packages comprise openings that are placed onto the pins so that the pins are fed through the openings. Subsequently, fastening elements can be placed onto pins inserted in this way, which fastening elements are, for example, designed as fastening discs that snap into place on the pins.

In order to prevent the establishment of thermal bridges at the fastening positions and in order to seal the insulation packages vis-à-vis the pins in the region of the fastening openings, ring-shaped foam material bodies, hereinafter also referred to as "foam rings" are widely used, which foam rings are arranged on the openings of the insulation packages. The foam rings can preferably also be completely integrated in corresponding fastening regions of insulation packages.

DE 10 2004 001 083 A1 and US 2007/0018042 A1 show widely used fastening elements for fastening insulation packages.

The fact that installation of the fastening discs requires additional process steps can be considered to be a significant disadvantage of such fastening methods. Furthermore, the large number of components to be kept in stock and, in the case of a multitude of fastening points within larger cabins, also the installation effort for establishing the insulation design is greater. This consequently either increases costs for personnel to tackle fastening of all the insulation packages with fastening elements, or it prolongs the time during which the cabin is blocked by installing personnel so that as a result of this no other process steps can be carried out on the cabin.

It may therefore be at least one object of the invention to propose an insulation package and a method for producing an insulation package that results in a reduction or in the avoidance of the disadvantages mentioned above. In particular, it may be the object of the invention to propose an insulation package that can be fastened in the vehicle cabin as easily as possible and involves little expenditure and a short installation time, while it provides at the same time at least equivalent fastening quality. In addition, other objects, desirable features, and characteristics will become apparent from the subsequent summary and detailed description, and the appended claims, taken in conjunction with the accompanying drawings and this background.

SUMMARY

A significant feature of the insulation package according to an embodiment of the invention is the fastening element for fastening the insulation package to a pin or to some other holding means being integrated directly in the insulation package according to the invention. As a result of integration of the fastening element, the step of separately applying an externally introduced fastening element onto the holding element is no longer required, since with the use of the insulation package according to the invention this step per se is already fully carried out with the arrangement of the insulation package on holding elements.

Many different fastening elements that may be directly integrated in the insulation package are possible. A possible and also preferred variant may comprise the integration of a disc in the region of the opening, and this disc may, for example, be fastened so as to snap into place on a holding element that may be designed as a pin. Other types of fastening elements may also be used that are not necessarily disc-shaped and that may, for example, establish a non-positive connection with the holding element. For example clips, hooks, eyelets, press studs and the like are imaginable.

If it is necessary at the same time to integrate in the insulation package a foam ring to provide a seal against the ingress of moisture and to prevent the establishment of thermal bridges, this foam ring may be modified to the effect that it also fulfils the task of fastening. On the other hand, it may also be possible to provide separate integration of fastening elements in the insulation package. Integration of the fastening element in the insulation package may preferably be carried out outside the cabin of the vehicle during production of the insulation package so that the cabin is blocked by installing personnel only for a short time during fastening of the insulation packages.

Integration of the fastening element may be on either side of a wrapping foil, and fastening can take place by means of bonding, welding, sewing or the like.

In a particularly preferred embodiment of the insulation package according to the invention, the fastening element may be integrated in a foam ring. In this process it may particularly be favourable if the foam ring is divided into two axial components between which the fastening element is positioned. The fastening element may, for example, be designed in the shape of a disc that comprises the same radial dimension as the foam ring or the axial components of the foam ring. As a result of this, part of the foam ring, a disc-shaped fastening element and a further component of the foam ring then extend in axial direction in a sandwich design.

Generally speaking, in a preferred embodiment of the insulation package according to the invention the fastening element can be integrated between wrapping foils of the insulation package and on its outside, irrespective of the use of foam rings.

Equally, the object may also be met by a method for producing an insulation package and by its use in the fuselage of an aircraft, and by an aircraft with at least one passenger cabin comprising an insulation structure with frame-element insulation packages and field insulation packages.

BRIEF DESCRIPTION OF THE DRAWINGS

Further features, advantages and application options of the present invention are disclosed in the following description of the exemplary embodiments and of the figures. All the described and/or illustrated features per se and in any combination form the subject of the invention, even irrespective of their composition in the individual claims or their interrelationships. Furthermore, identical or similar components in the figures have the same reference characters and;

DETAILED DESCRIPTION

The following detailed description of the invention is merely exemplary in nature and is not intended to limit application and uses. Furthermore, there is no intention to be bound by any theory presented in the preceding background or summary or the following detailed description.

Figure 1:
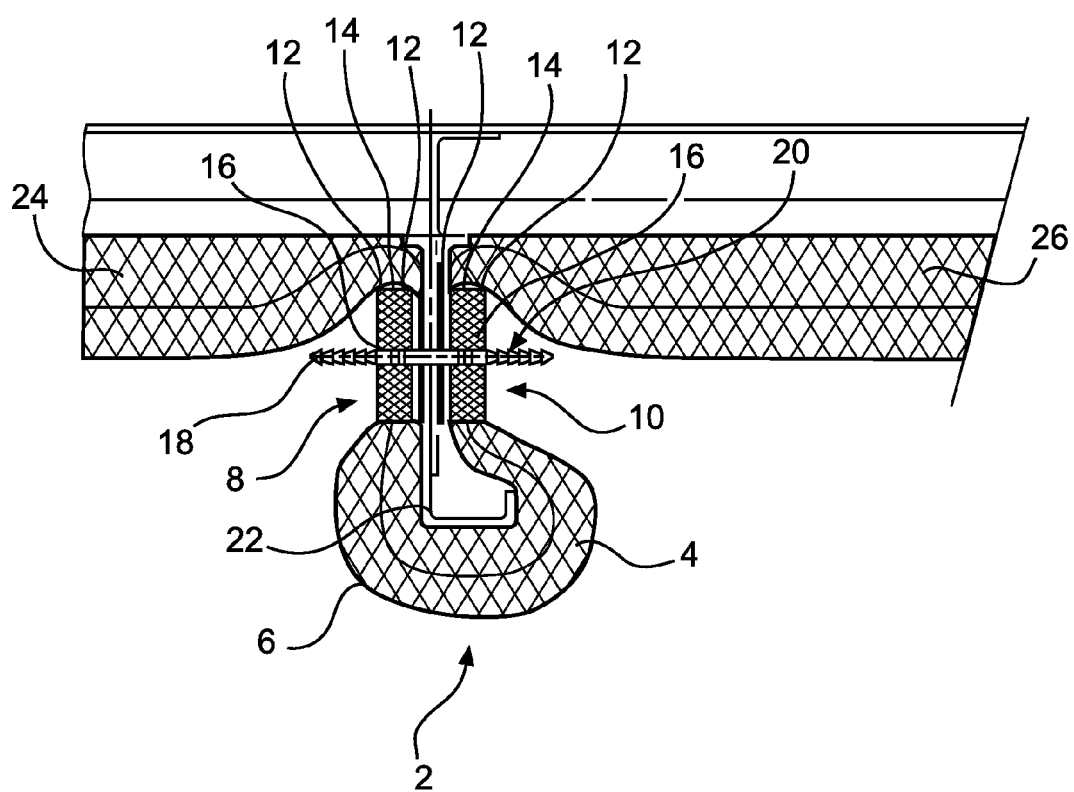
FIG. 1 shows a diagrammatic view of an insulation package according to an embodiment of the invention.

FIG. 1 shows an insulation package 2 according to an embodiment of the invention, which insulation package 2 comprises a core layer 4 that is enveloped by a wrapping foil 6. At its ends 8 and 10 the insulation package 2 according to an embodiment of the invention comprises a combination of two foam rings and a fastening element 14 which are joined in a sandwich-like manner.

The foam rings 12 and the fastening element 14, which is, for example disk-like in design and comprises the same radial extension as the foam rings 12, provide an opening 16 through which a holding element 18, which is, for example, designed as a pin, can be fed. The fastening element 14 is designed such that, for example, a positive-locking connection with the holding element 18 can be established in that the fastening element 14 can snap into place on the holding element 18. To this effect the holding element 18 comprises several snap-lock areas 20 which correspond to at least one snap-lock area (not shown in this figure) on the fastening element 14. As an alternative to this the fastening element 14 is designed in such a manner than during slide-on a non-positive connection with the holding element 18 is established.

In the case shown the foam rings 12 and the fastening element 14 are arranged between the wrapping foils 6 so that they are situated completely within the insulation package 2.

FIG. 1 further shows that the insulation package 2 is, for example, designed as a frame-element insulation package, and accordingly is arranged on a frame element 22. Adjacent insulation packages 24 and 26 are designed as so-called field insulation packages; they line skin fields of the vehicle body or fuselage, which skin fields are situated between frame elements. Prior to affixation of the insulation package 2, the field insulation packages 24 and 26 are arranged on the holding element 18, after which, subsequently, the insulation package 2 is pushed from the outside against the frame element 22. Consequently the ends of the field insulation packages 24 and 26 are held to the frame element 22 as a result of the pushed-on ends 8 and 10 of the insulation package 2 so that no independent fastening elements are necessary.

Figure 2A:
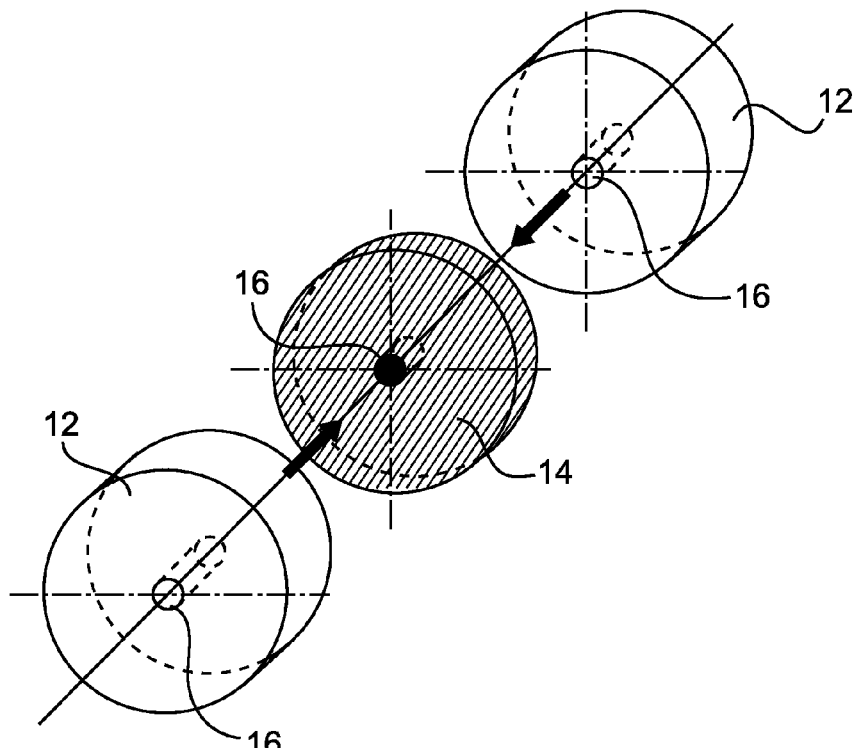
FIGS. 2a to 2c show detailed views of an integrated fastening element.
Figure 2B:
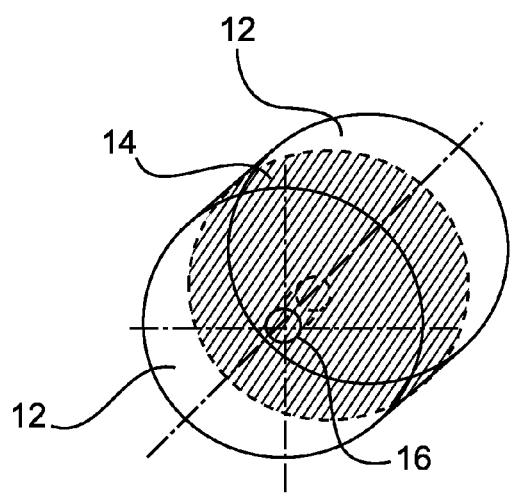
Figure 2C:
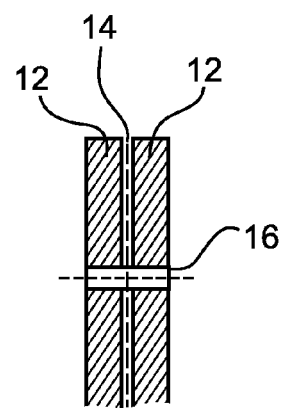

FIGS. 2a to FIG. 2c show the manner in which the foam rings 12 and the fastening element 14 are assembled to form an integrated fastening element. Two foam rings 12 and one fastening element are arranged so as to be concentric to each other and essentially comprise the same radial extension. It should be noted that the axial extension of the fastening element 14 can be less than that of the usual fastening discs in the state of the art, because the foam rings 12 themselves provide some rigidity, and consequently the rigidity of the fastening element 14 can be reduced correspondingly.

Likewise, for the same reason it is also possible for the foam rings 12 to comprise a slightly reduced axial extension than is usually the case in the state of the art, because their dimensional stability is supported by the fastening element 14. As a result of this, the weight of said foam rings can be significantly reduced over the total number of foam rings used in the vehicle body.

Figure 3A:
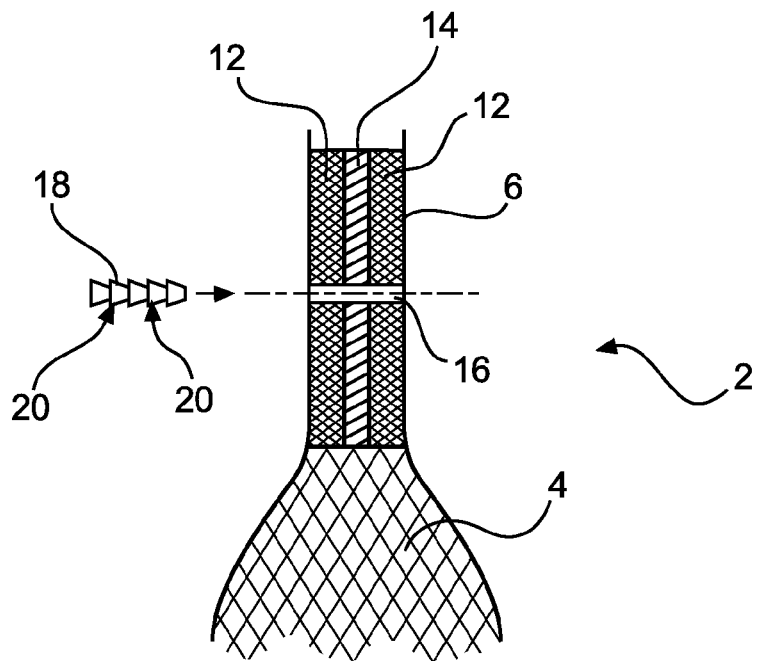
FIGS. 3a and 3b show exemplary arrangement options of an integrated fastening element.
Figure 3B:
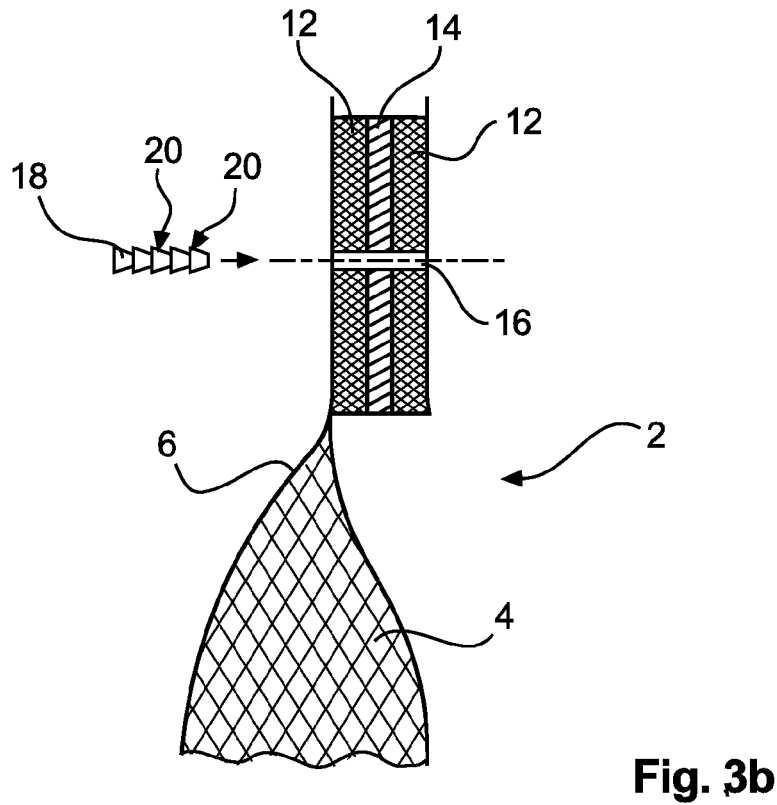

FIGS. 3a and FIG. 3b show examples of two different options of arranging an integrated fastening element in the form of two foam rings 12 and a fastening element 14 on a wrapping foil 6. In FIG. 3a, the foam rings 12 and the fastening element are integrated between two wrapping foils at their facing sides. In FIG. 3b, the foam rings 12 and the fastening element 14 are arranged on an outside of a wrapping foil 6. In principle, integration of foam rings 12 within the wrapping foils 6 while at the same time the fastening element 14 is arranged on the outside of a wrapping foil 6, or vice versa, is imaginable.

Figure 4:
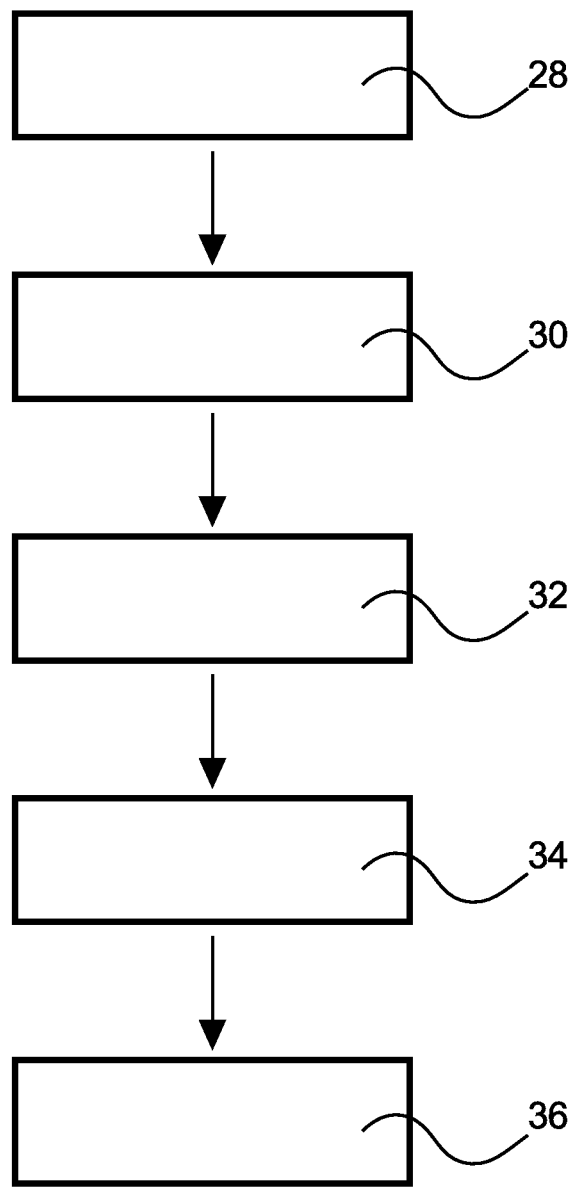
FIG. 4 shows a diagrammatic overview of a method according to an embodiment of the invention for producing an insulation package according to an embodiment of the invention.

FIG. 4 shows an overview of an exemplary embodiment of the method according to the invention for producing an insulation package. The method comprises, for example, the provision 28 of a wrapping foil 6 onto which insulation material is placed 30. As an alternative to this, it is also possible to first provide the insulation material and thereafter to place a wrapping foil around or to the insulation package. On an opening of the wrapping foil 6 a fastening element 14 is arranged 32, whereupon subsequently the insulation package is completed 34 by folding over part of the already existing wrapping foil 6 or by means of an additional wrapping foil 6. Optionally, before or after completion of the insulation package one or several foam rings 12 can be arranged on a wrapping foil 6 or between two wrapping foils 6 that optionally envelope the fastening element.

Figure 5:
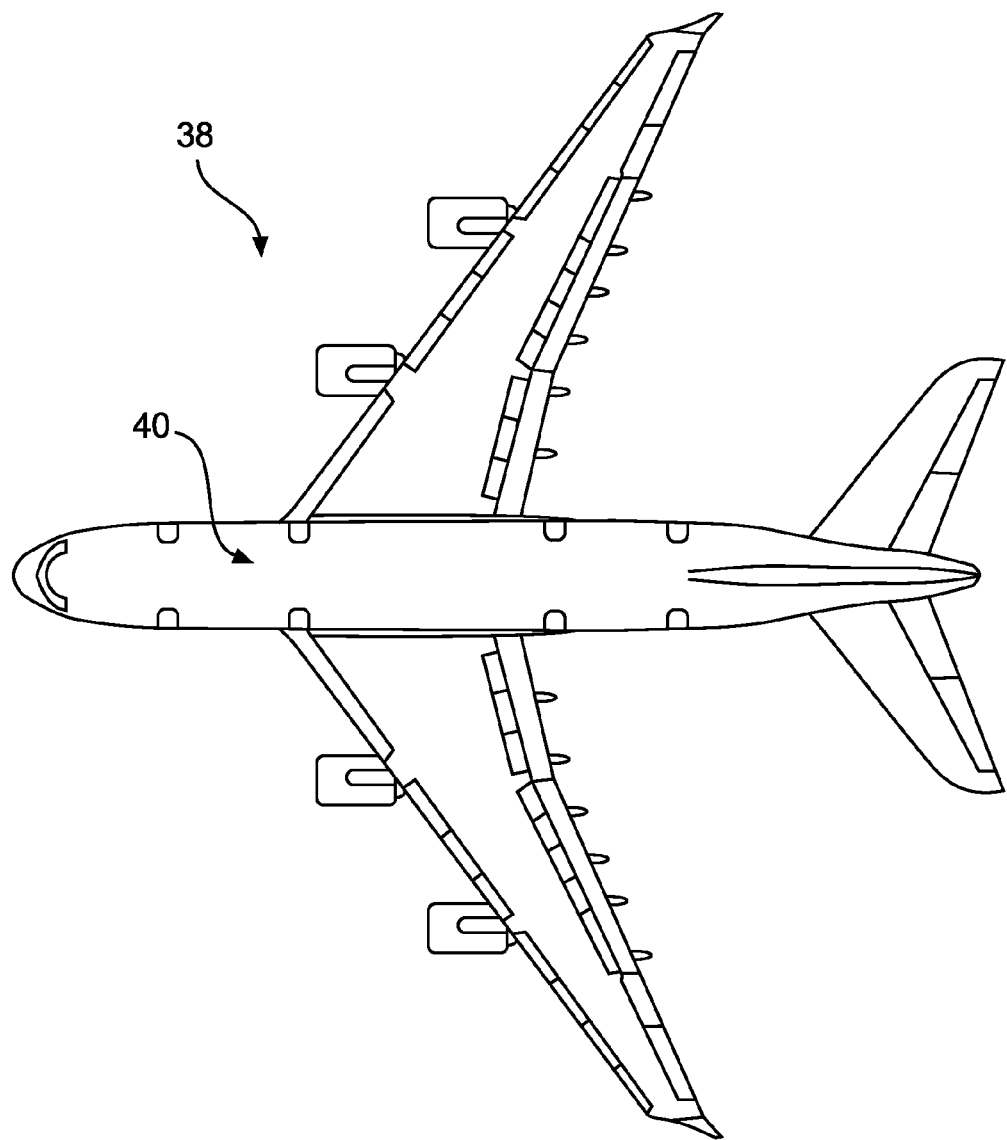
FIG. 5 shows an aircraft comprising an insulation structure comprising at least one insulation package according to an embodiment of the invention.

Finally, FIG. 5 shows an aircraft 38 that has at least one passenger cabin 40 comprising an insulation structure with at least one insulation package 2 according to an embodiment of the invention.

In addition, it should be pointed out that "comprising" does not exclude other elements or steps, and "a" or "one" does not exclude a plural number. Furthermore, it should be pointed out that features or steps which have been described with reference to one of the above exemplary embodiments can also be used in combination with other features or steps of other exemplary embodiments described above. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. An insulation package for insulating a cabin of a vehicle, comprising:
   a wrapping foil;
   a core layer of an insulation material, wherein the wrapping foil envelopes the core layer at least in some regions and comprises an opening at a first end for feeding-through a pin as a holding element; to couple the insulation package to a frame element of the cabin of the vehicle;
   an annular fastening element coupled to the wrapping foil in a region of the opening at the first end, the fastening elements defining a bore that snaps into place on the pin fed through the opening;
   a first foam ring couples to a first side of the fastening element such that the pin is fed through the first foam ring and then the bore of the fastening element at the first end; and
   a second foam ring coupled to a second side of the fastening element, so that the fastening element is sandwiched between the first foam ring and the second foam ring, and the pin is fed through the second foam ring at the first end coupling the insulation package to the cabin of the vehicle,
   wherein the fastening element is a disc having substantially the same radial dimensions as the first foam ring and the second foam ring.

2. The insulation package of claim 1, further comprising a second wrapping foil, wherein the second wrapping foil and the wrapping foil are folded over the core layer with connected ends that lie one on top of the other.

3. The insulation package of claim 1, wherein the wrapping foil is a single wrapping foil folded over the core layer with connected ends that lie one on top of the other.

4. The insulation package of claim 3, wherein the fastening element is arranged between the connected ends of the wrapping foil.

5. The insulation package of claim 1, wherein the fastening element is arranged on a side of the wrapping foil that faces away from the core layer.

6. The insulation package of claim 1, wherein the first foam ring insulates the opening against a formation of thermal bridges and an ingress of moisture.

7. An aircraft; comprising:
   a passenger cabin comprising at least one insulation structure with an insulation package, the insulation package comprising:
   a wrapping foil; and
   a core layer of an insulation material, wherein the wrapping foil envelope the core layer at least in some regions and comprises an first opening at a first end for feeding-through a pin as holding element and a second opening at a second end for receipt of the pin;
   a first annular fastening elements coupled to the wrapping foil in a region of the first opening that defines a bore that snaps into place on the pin fed through the first opening;
   a first foam ring coupled to a first side of the first fastening elements such that the pin is fed through the first foam ring and then the bore of the first fastening elements at the first end;
   a second fastening elements coupled to the wrapping foil in a region of the second opening that snaps into place on the pin received through the second opening; and
   a second foam ring coupled to a second side of the first fastening element so that the first fastening element is sandwiched between the first foam ring and the second foam ring, and the pin is fed through the first ring, the first fastening element and second foam ring at the first end to couple the insulation package to the passenger cabin of the aircraft,
   wherein the first fastening element is a first disc having substantially the same radial dimensions as the first foam ring and the second foam ring.

8. The aircraft of claim 7, further comprising a second wrapping foil, wherein the second wrapping foil and the wrapping foil are folded over the core layer with connected ends that lie one on top of the other.

9. The aircraft of claim 7, wherein the wrapping foil is a single wrapping foil folded over the core layer with connected ends that lie one on top of the other.

10. The aircraft of claim 9, wherein the first fastening element is arranged between the connected ends of the wrapping foil.

11. The aircraft of claim 7, wherein the first fastening element is arranged on a side of the wrapping foil that faces away from the core layer.

12. The aircraft of claim 7, further comprising a third foam ring and a fourth foam ring for insulating the second opening against a formation of thermal bridges and an ingress of moisture.

13. The aircraft of claim 12, wherein the third foam ring is coupled to a first side of the second fastening element and the forth foam ring is arranged on a second side of the second fastening element.

14. The aircraft of claim 12, wherein the second fastening element, the third foam ring and the fourth foam ring form a sandwich-like structure.

15. The aircraft of claim 14, wherein the first foam ring, the second foam ring and the first fastening element are disposed within the wrapping foil at the first end, and the third foam ring, the fourth foam ring and the second fastening element are disposed within the wrapping foil at the second end.

16. The aircraft of claim 7, wherein the second fastening element is comprised of a second disc having substantially the same radial dimension as the third foam ring.

* * * * *

UNITED STATES PATENT AND TRADEMARK OFFICE
CERTIFICATE OF CORRECTION

PATENT NO. : 8,882,041 B2
APPLICATION NO. : 12/816524
DATED : November 11, 2014
INVENTOR(S) : Rainer Mueller and Stefan Nill It is certified that error appears in the above-identified patent and that said Letters Patent is hereby corrected as shown below:

In the Claims

Column 5, Claim 1, line 26, "elements" should be changed to --element--

Column 5, Claim 1, line 28, "couples" should be changed to --coupled--

Signed and Sealed this
Seventeenth Day of March, 2015

Michelle K. Lee
*Director of the United States Patent and Trademark Office*